United States Patent
Thorpe et al.

(10) Patent No.: US 8,842,557 B2
(45) Date of Patent: Sep. 23, 2014

(54) COMPUTER TELEPHONY SYSTEM

(75) Inventors: Peter D Thorpe, Suffolk (GB);
Laurence J Booton, Suffolk (GB)

(73) Assignee: British Telecommunications PLC, London (GB)

( * ) Notice: Subject to any disclaimer, the term of this patent is extended or adjusted under 35 U.S.C. 154(b) by 1727 days.

(21) Appl. No.: 12/093,797

(22) PCT Filed: Nov. 10, 2006

(86) PCT No.: PCT/GB2006/004209
§ 371 (c)(1), (2), (4) Date: May 15, 2008

(87) PCT Pub. No.: WO2007/063275
PCT Pub. Date: Jun. 7, 2007

(65) Prior Publication Data
US 2008/0317005 A1    Dec. 25, 2008

(30) Foreign Application Priority Data

Dec. 2, 2005 (EP) .................................... 05257448

(51) Int. Cl.
*H04L 12/28* (2006.01)
*H04M 7/00* (2006.01)
*H04M 3/51* (2006.01)

(52) U.S. Cl.
CPC ............ *H04M 7/003* (2013.01); *H04M 7/0012* (2013.01); *H04M 2203/6018* (2013.01); *H04M 3/5183* (2013.01)
USPC .......................... 370/252; 370/395.2; 370/401

(58) Field of Classification Search
None
See application file for complete search history.

(56) References Cited

U.S. PATENT DOCUMENTS

| | | | | |
|---|---|---|---|---|
| 5,812,533 A | * | 9/1998 | Cox et al. | 370/259 |
| 5,991,390 A | * | 11/1999 | Booton | 379/265.02 |
| 6,275,573 B1 | | 8/2001 | Naor et al. | |
| 6,324,264 B1 | | 11/2001 | Weiner et al. | |
| 6,337,857 B1 | * | 1/2002 | Booton | 370/352 |

(Continued)

FOREIGN PATENT DOCUMENTS

| CN | 1640110 | 7/2005 |
|---|---|---|
| EP | 1 372 325 | 12/2003 |

(Continued)

OTHER PUBLICATIONS

Brockbank R. et al.: "Click Dial Web-Enabled CTI" British Telecommunications Engineering, London, GB, vol. 18, No. 1, Apr. 1999, pp. 18-24, XP00829903.
International Search Report for PCT/GB2006/004209 dated Feb. 14, 2007.

(Continued)

*Primary Examiner* — Gregory Sefcheck
*Assistant Examiner* — Daniel Mitchell
(74) *Attorney, Agent, or Firm* — Nixon & Vanderhye, P.C.

(57) ABSTRACT

A method and apparatus for securely registering an association between a computer terminal and a selected one of a plurality of communications terminals in a computer telephony system. An association is established according to a known technique between the identity of the selected communications terminal and the identity of the computer terminal to allow for control of the communications terminal by a user via the computer terminal. An abstract representation of the identity of the communications terminal is; generated and provided to a third party system accessible by the user. The user can then implement control of the selected communications terminal via the third party system whilst not prejudicing the security of the system.

19 Claims, 2 Drawing Sheets

(56) References Cited

U.S. PATENT DOCUMENTS

Figure 1:
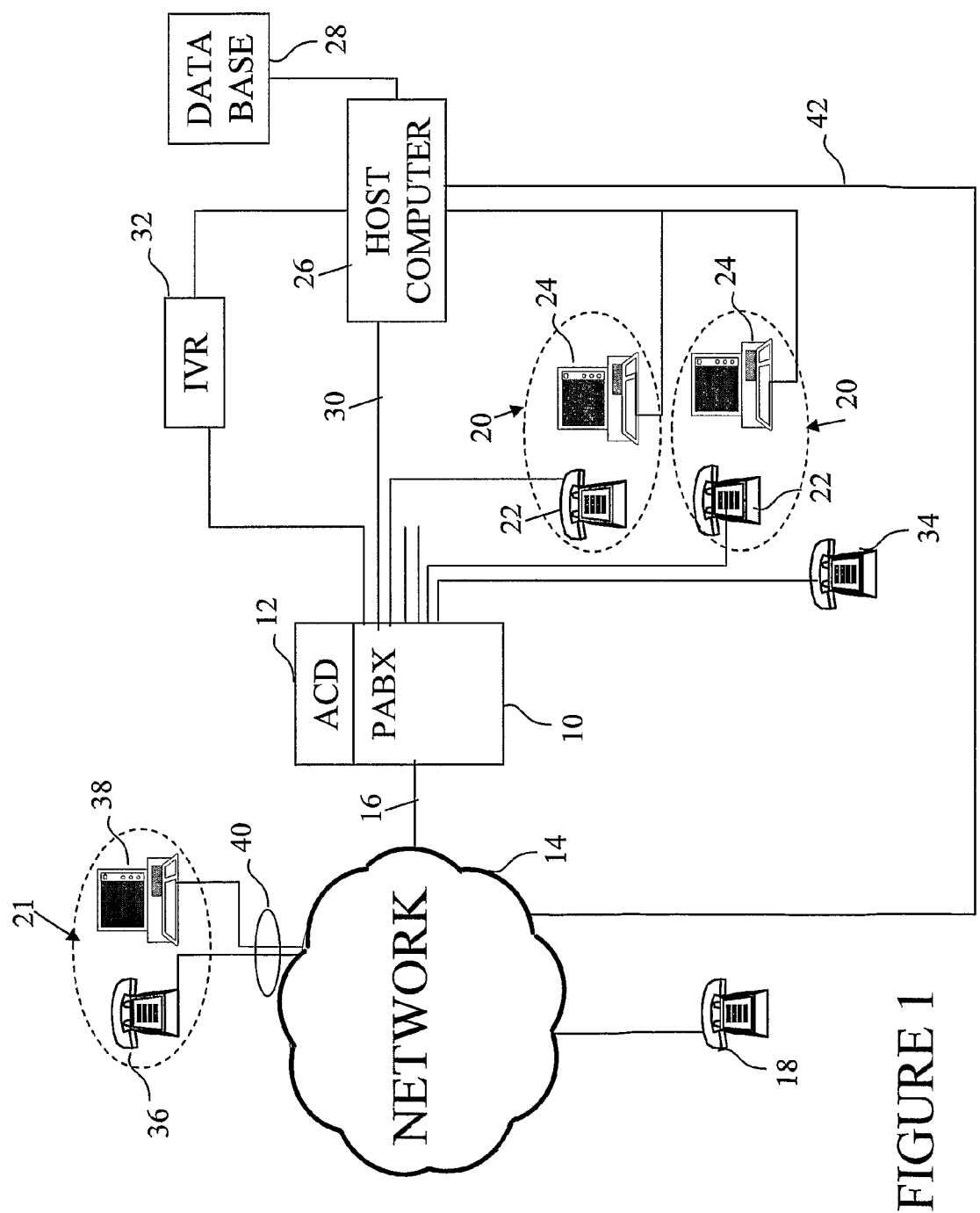

| | | | |
|---|---|---|---|
| 6,594,357 B1 * | 7/2003 | Emerson et al. | 379/265.04 |
| 6,760,322 B1 * | 7/2004 | Fukuda et al. | 370/352 |
| 7,940,792 B2 * | 5/2011 | Raghav et al. | 370/466 |
| 2002/0062355 A1 * | 5/2002 | Luegger et al. | 709/213 |
| 2002/0181460 A1 * | 12/2002 | Strathmeyer et al. | 370/389 |
| 2003/0009530 A1 | 1/2003 | Philonenko et al. | |
| 2003/0142806 A1 | 7/2003 | Unger | |
| 2004/0013107 A1 | 1/2004 | Mitreuter et al. | |
| 2004/0122951 A1 | 6/2004 | Beck et al. | |
| 2004/0179669 A1 * | 9/2004 | Gilbert et al. | 379/221.15 |

FOREIGN PATENT DOCUMENTS

| | | |
|---|---|---|
| EP | 1 372 325 A1 | 12/2003 |
| WO | 96/31044 | 10/1996 |
| WO | 01/17216 A2 | 3/2001 |

OTHER PUBLICATIONS

Brockbank, R., et al., "ClickDial Web-Enabled CTI," British Telecommunications Engineering, vol. 18, Apr. 1999, pp. 18-24, XP-000829903.

Office Action issued on Apr. 8, 2013 in corresponding Chinese Application No. 200680045056.2 (with translation).

Chinese Office Action issued in Application No. 200680045056.2 dated Dec. 22, 2010 (3 pp.).

Chinese Office Action issued in Application No. 200680045056.2 dated Aug. 13, 2012 (6 pp.).

Chinese Office Action issued in Application No. 200680045056.2 dated Jan. 6, 2013 (3 pp.).

Chinese Office Action issued in Application No. 200680045056.2 dated Apr. 8, 2013 (13 pp.).

Chinese Office Action issued in Application No. 200680045056.2 dated Oct. 9, 2013 (12 pp.).

* cited by examiner

COMPUTER TELEPHONY SYSTEM

This application is the U.S. national phase of International Application No. PCT/GB2006/004209 filed 10 Nov. 2006 which designated the U.S. and claims priority to European Application No. 05257448.0 filed 2 Dec. 2005, the entire contents of each of which are hereby incorporated by reference.

This invention relates to a computer telephony integration (CTI) in general and to a system and method providing for control of a communications terminal by a user via a computer terminal.

Examples of such CTI environments are disclosed in the articles "Introduction to Computer Telephony Integration", by A. Catchpole, G. Crook, and D. Chesterman, British Telecommunications Engineering, July 1995; "Computer Telephony Integration—The Meridian Norstar", by A. Catchpole, British Telecommunications Engineering, October 1995; "Computer Telephony Integration—The Meridian 1 PBX", by P. Johnson, A. Catchpole, and L. Booton, British Telecommunications Engineering, July 1996; "Caliscape—Computer Telephony Integration for the Small Business", by G. Hillson, G. Hardcastle, and M. Allington, British Telecommunications Engineering, January 1997, and "Call Centres—Doing Business by Telephone" by M. Bonner, British Telecommunications Engineering, July 1994.

CTI is particularly useful in call centres, and International Application Number PCT/GB96/00727 (Publication Number WO 96/31044) in the name of BRITISH TELECOMMUNICATIONS public limited company discloses an automatic call distribution (ACD) suite in a call centre such as BT's national telephone account management operation.

In such a call centre, if an agent wants to be connected to the number of a target customer, for example a potential customer in a telesales mode of the call centre, the agent sends a "make call" command to the call control apparatus. Either the agent will specify a desired number to call, referred to as the target number, by inserting this into the command, or upon receipt of a make call command that does not contain a target number, the call control apparatus will generate a suitable number using a sales program as is known in the art. The call control apparatus will then send to the switching system a command containing a target directory number and the directory number of a telephony terminal which is to be joined to the external call to the target customer. The telephony terminal and the target customer are now connected together by the switching system so that the agent may speak to the target customer. Depending upon the control program of the switching system, this is effected in any one of a number of known ways. For example, in one way the switching system makes an external call to the supplied target directory number, and, when the target customer answers, then makes a call to the telephony terminal, and joins the two calls when the agent answers the call to the telephony terminal, and in another way the switching system makes a single call from the telephony terminal to the target number.

A problem can arise if the call control apparatus registers an association between the agent and a telephony terminal number other than the number of the telephone terminal that is associated with the agents computer terminal to form a workstation, as is known in the art, as the wrong agent will be connected to the target customer.

European patent specification 1068717 in the name of BRITISH TELECOMMUNICATIONS public limited company discloses a method of registering the identity of a communications terminal in association with the identity of a computer terminal, the method comprising the steps of:

providing to a user of the computer terminal, via that computer terminal, the identity of a predetermined destination terminal number; answering a call made to that predetermined destination terminal number; receiving at that predetermined destination terminal number the identity of a communications terminal from which that call was made; providing to the user, via that computer terminal, a codeword; receiving, at that predetermined destination terminal, data provided by the user via that telephone terminal; comparing the received data with the provided codeword; and if there is a match, registering the identity of that communications terminal in association with the identity of that computer terminal.

The aforementioned patent also discloses a system for registering the identity of a communications terminal in association with the identity of a computer terminal, the system comprising:— means to provide to a user of the computer terminal, via that computer terminal, the identity of a predetermined destination terminal number;

means to answer a call made to that predetermined destination terminal number;

means to receive the identity of a telephone terminal from which that call was made;

means to provide to the user, via that computer terminal, a codeword;

means to receive data provided by the user via that telephone terminal;

means to compare the received data with the provided codeword; and means responsive to a match between the received data and the provided codeword to register the received identity of that telephone terminal in association with the identity of that computer terminal.

Once the correct association has been established between the computer terminal and the telephone terminal, the web browser used to interact with the registration server delivers a "cookie" to the computer. The cookie holds the information needed to associate the computer and telephone.

The secure registration of a telephone terminal with a computer terminal brings advantages in a number of fields.

In a call centre, since the call control apparatus registers the identity of the telephone terminal that makes the call, herein referred to as a registration call, to the predetermined destination terminal number, in this particular case an extension of the switching system, it will normally be only the agent at the computer terminal who will know the codeword, e.g. from the screen display, and who will make the registration call from his chosen terminal, which may be the telephony terminal at the workstation, or it may be his mobile telephone. Therefore, unless a situation is contrived in which a registration call, using that particular codeword, is made to the predetermined telephony terminal from a terminal other than a terminal which will be normally answered by the agent, the call control apparatus will always register the correct telephone terminal identity in association with the computer terminal and the agent identity.

In a conventional CTI office environment a user can use his computer terminal to request an outgoing call, and a CTI controller will command a PABX serving the office to make a call from the telephony terminal registered in association with that computer terminal.

The earlier invention also makes receipt of incoming calls secure. For example, a remote originator can either request registration information from a user's computer terminal, or be sent it unsolicited, and make a call to the telephone number of that registration information, i.e. the identity of the telephone terminal associated with that computer terminal. Depending upon the particular commands used in the signaling protocol, the identity of the telephone terminal may be the sole information in a message sent to the remote originator, or it may be associated with other information.

The step of providing the identity of a predetermined destination terminal number may be performed upon detection of a make call command made via that computer terminal.

The means to provide the identity of a predetermined destination terminal number may be arranged such as to provide said identity of a predetermined destination terminal number upon detection of a make call command invoked by the user.

The means to provide the identity of a predetermined destination terminal number; the means to provide to the user, via that computer terminal, a codeword; the comparing means; and the registering means together may constitute a subsystem; and the answering means; the means to receive the identity of a telephone terminal; and the means to receive data provided by the user together may constitute a separate subsystem.

This prior art registration system requires the provision of a service platform associated with the predetermined destination terminal that can receive the codeword and provide the appropriate registration details to the CTI platform. A simplified procedure, that avoids the need for such a platform has also been proposed, as detailed below.

A further prior art system described in co-pending application EP 05255169.4 in the name of BRITISH TELECOMMUNICATIONS public limited company provides a method of registering the identity of a communications terminal in association with the identity of a computer terminal, the method comprising the steps of:

providing to a user of the computer terminal, via that computer terminal, a predetermined sequence of destination terminal numbers selected from a plurality of such numbers; monitoring calls made to the predetermined sequence of destination terminal numbers; identifying a communications terminal from which the predetermined sequence of calls is made; if there is a match, registering the identity of that communications terminal in association with the identity of that computer terminal. According to a second aspect there is provided a system for registering the identity of a communications terminal in association with the identity of a computer terminal, the system comprising:— means to provide to a user of the computer terminal, via that computer terminal, a predetermined sequence of destination terminal numbers selected from a plurality of such numbers; means to identify a telephone terminal from which calls to the predetermined sequence of telephone numbers is made; and means responsive to a match between the sequence of telephone numbers dialed to register the received identity of that telephone terminal in association with the identity of that computer terminal.

Each of the predetermined destination terminal numbers may be provided upon detection of a make call command made via that computer terminal. This may be made subject to the call having been made to the previous number in the sequence.

As with the earlier systems, having established the correct association between telephone terminal and computer terminal, a cookie is delivered to the computer terminal identifying that association, as previously discussed.

The above references to the prior art are given for the purposes of providing background to the present invention and are not to be taken as an indication that the content of the cited prior art documents constitutes common general knowledge.

The invention relates to control of a communications terminal in a computer-telephony integration (CTI) system The present invention allows control the operation of the communications terminal via third-party systems such as the Microsoft Live Communications Server (LCS) system while maintaining security from inadvertent or malicious misuse.

The present invention provides a method of securely registering an association between a computer terminal and a selected one of a plurality of communications terminals in a computer telephony system the method including the steps of: establishing an association between the identity of the selected communications terminal and the identity of the computer terminal to allow for control of the communications terminal by a user via the computer terminal; generating an abstract representation of the identity of the communications terminal and providing the representation to a third party system accessible by the user.

The invention preferably provides for receiving at the computer telephony system the representation from the third party system and identifying in the computer telephony system the communications terminal represented.

The present invention also provides a computer telephony system comprising a plurality of communications terminals; in which the computer telephony system also comprises registration means for establishing an association between the identity of a computer terminal and the identity of one of the communications terminals to allow for control of the communications terminal by a user via the computer terminal; in which the registration means is arranged in use, upon establishing the association, to generate an abstract representation of the identity of the communications terminal and to provide the representation to a third party system accessible by the user.

The computer telephony system preferably include means for receiving the representation from the third party system and identifying in the computer telephony system the communications terminal represented.

The present invention also provides a registration server for establishing an association between the identity of a computer terminal and the identity of one of a plurality of communications terminals to allow for control of the communications terminal by a user via the computer terminal; in which the registration sever is arranged in use, upon establishing the association, to generate an abstract representation of the identity of the communications terminal and to provide the representation to a third party system accessible by the user The present invention also provides a communications system comprising a telephony system or a registration server according to the invention.

Figure 2:
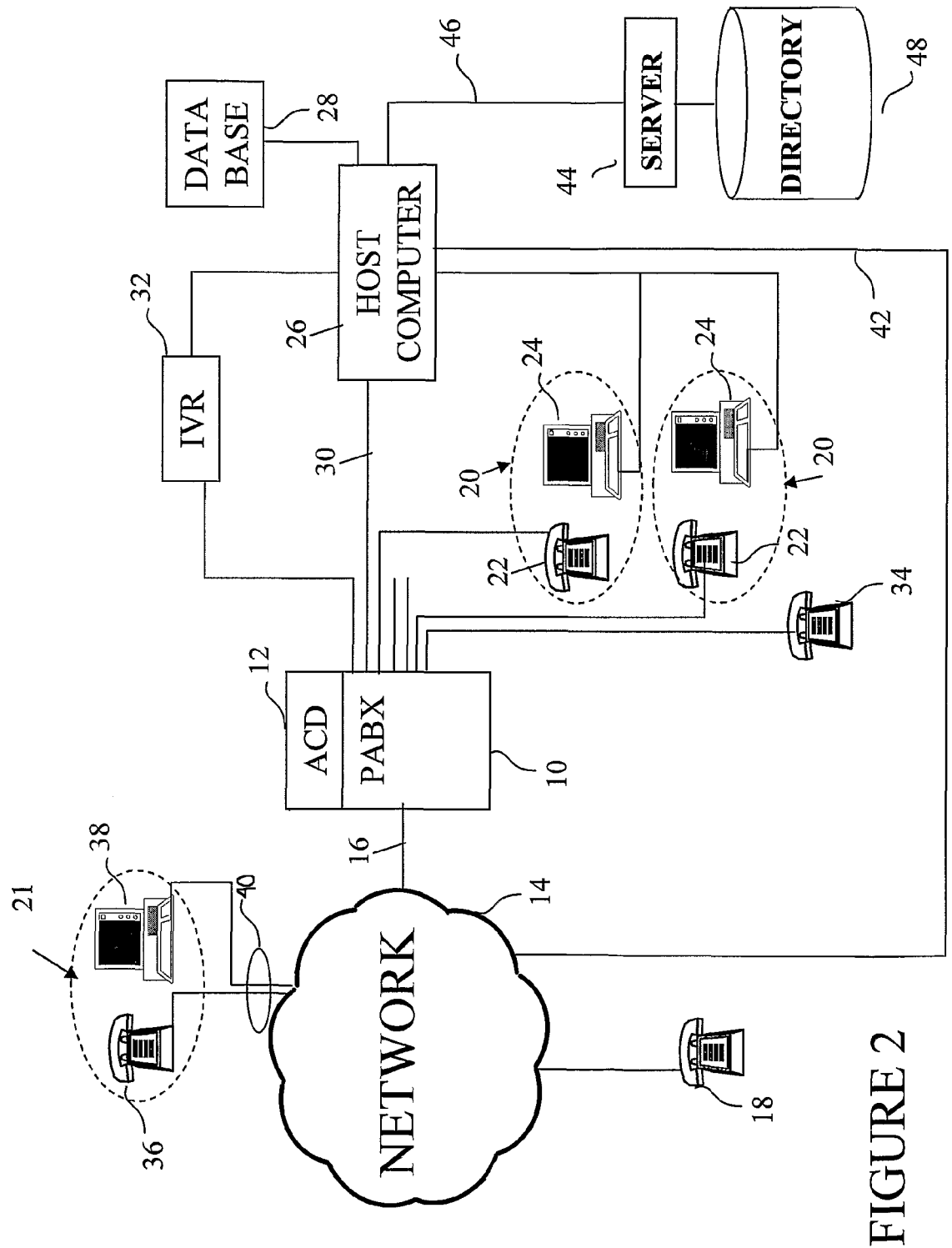

The invention will now be described with reference to specific embodiments of the invention that include the best mode known to the inventor. Those skilled in the art will appreciate that the invention is not intended to be limited to the embodiments described but instead should be accorded the scope defined by the accompanying claims. The embodiments will be described with reference to the drawings in which:

FIG. 1 shows schematically a CTI system implementing a registration scheme as known in the art; and FIG. 2 shows schematically a secure registration system according to an embodiment of the invention.

A known CTI system will now be described in more detail with reference to FIG. 1. FIG. 1 shows telephony switch, PABX 10, associated with ACD system 12 and connected to a public communications network 14, e.g., an Integrated Services Digital Network (ISDN), by a primary rate ISDN link 16 having thirty 64 kbit/s channels.

Customers, represented by telephone terminal 18, can make calls to the call centre by dialing the published directory number (also referred to as a national number or a destination terminal number) of the call centre. These incoming calls are received at the PABX 10 and placed in a queue by the ACD system 12. The ACD system 12 in known manner allocates the call at the head of that queue to a selected one of a plurality of call centre agent positions 20 (also referred to as workstations), each comprising a telephone terminal 22 (also referred to as an ACD turret) and an associated computer terminal 24. The association of a telephone terminal 22 with a computer terminal 24 is indicated in the Figure by a dashed line enclosing the two.

Similarly, tele-working agents represented by remote workstation 21 comprising telephone terminal 36 and associated computer terminal 38, can make calls to the call centre by dialing a published directory number of the call centre over a telephone link 40. Telephone link 40 is capable of supporting voice and data communication over different channels, such as in an ISDN link.

Consider where each computer terminal 24 is constituted by a personal computer, commonly referred to as a PC, and is connected to a host computer 26 having an associated database 28 and connected to the PABX 10 via a CTI link 30. An interactive voice response system (IVR) 32 is connected to a port of the PABX 10 and to the host computer 26, and is arranged to obtain data from customers, and tele-working agents, and to pass this to the host computer 26 for processing as appropriate. In this way tele-working agents are able to be registered and customers are connected either to agents in the call-centre or to remote tele-working agents as appropriate.

In order to support tele-working, the ACD system 12 must still associate a tele-working agent's identity with the identity of what it deems to be an active terminal 22 in the call centre, and the manner in which this is achieved will now be described.

In a first situation, a tele-working agent will activate his or her computer terminal 38 which will autodial the directory number of the host computer 26. When a connection (using one of the B channels) has been established via the ISDN link 16, the tele-working agent will log on to the host computer 26 using an identification protocol including informing the host computer 26 of the directory number being currently used by the tele-working agent, and the host computer 26 will store the tele-working agent's directory number in association with the identity of tele-working agent. If the tele-working agent is not permitted to change location without prior consent of the company, the tele-working agent does not inform the host computer 26 of the identity of the remote terminal, and the host computer 26 will refer to its record and retrieve the appropriate data.

The host computer 26 will now select an available terminal 34 from its list of virtual turrets, associate the tele-working agent's identity with the identity of the selected terminal 34, and send them to the ACD system 12 via the CTI link 30. The host computer 26 now has a record associating the identity of the agent, the identity of the remote terminal, and the identity of the selected terminal 34 and can upon interrogation for the identity of a terminal 34 retrieve the identity of the corresponding remote terminal. The ACD system can then operate in a number of ways such as are described in more detail within International Application Number PCT/GB96/00727 (Publication Number WO 96/31044).

On successful completion of a CTI registration process during which a communications terminal (e.g. telephone apparatus) is associated with a computer terminal, a cookie is created recording the association of the communications terminals and the computer terminal. The cookie is created by the CTI system by means of a registration server which is an application running on the host computer. It is the registration server that establishes the association. In the conventional system the cookie is provided to the users computer where it is stored by a web browser operable by the user. When the user wishes to issues commands to the telephone terminal from their computer this is done using an application that uses the web browser to communicate with the host computer and to send the cookie identifying the registered association to the host computer. A control interface on the communications switch (PABX) to which the communications terminal is attached provides the host computer control of the communications switch. Operation of the communications terminal, i.e. for initiating a telephone call, can therefore be remotely controlled by the user via their computer terminal. The cookie used in the conventional system contains the identity of the communications terminal i.e. its directory number (DN).

It is desired for users to control the operation of their communications terminals via a third-party system such as the Microsoft LCS system. In this case, the user will use a LCS client (not shown) resident on computer terminals 24 and in communication with a remote LCS server 44 that is itself in communication with the host computer 26. However, while the user can be fairly confident of the security of a directory number when stored on their personal computer and inaccessible to third party systems, if the user is required to make a directory number (DN) identifying the associated terminal available to the server 44, i.e. to a system outside the users direct control and outside the CTI system, this introduces potential security weakness into the system as the directory number would be open to corruption or replacement in the third-party system.

The third party system is easiest to conceptualize as a separate "box", e.g. a separate server but with the increasing trend towards convergence and integration, the third party system could equally form a part of the physical communications terminal or user's computer.

Third party systems can be configured to allow the user to configure any DN they want. This can lead to a user being given control of the wrong communications equipment, whether in error or maliciously. In particular, the MS LCS third party system places no restriction on the DN value a user can enter. The host computer according to the present invention only accepts cookies containing an abstract representation in place of an actual DN. The only way a user can generate a valid cookie is via the registration process controlled by the host computer. The user, or any one else on the network or the third party system, has access to and can alter the cookie, but as they do not know how to generate a valid representation will not be able to control a different DN.

A CTI system according to the present invention will now be described in more detail with reference to FIG. 2. FIG. 2 shows a CTI system similar to that shown in FIG. 1 Common elements are given the same reference numerals and will not be described further here. In the system of FIG. 2, host computer 26 is additionally connected to a server 44 via data link 46. Server 44 is further connected to directory 46. According to a preferred embodiment, server 44 is a Microsoft LCS server and directory 48 is a Microsoft Active Directory. The active directory is a multifunction database that, in the case of a server running CTI applications, provides storage for directory numbers.

The present invention replaces the directory number in the cookie with a representative value created by the registration server and interpretable by the host computer but not having any significance outside of these two systems. This acts to safeguard against unauthorised changes to the DN in the third party system that could lead to unauthorised use of terminal equipment allocated to someone else. The safeguard is achieved as the correct value corresponding to any particular telephony terminal number would not be known outside of the registration server and the host computer. Advantageously, according to a preferred embodiment, the representative value is not prone to deciphering or decoding as it is given an arbitrary value not related to the value of the corresponding DN.

According to the first embodiment the value representative of the directory number is stored on the users computer in the Microsoft registry, an area accessible to the server. When the user wishes to initiate action in the communications system, they operate their computer to send a "monitor start" request to the server. Setting a "monitor" allows the system to see activity on a particular communication terminal, i.e. when a call has been originated from it, or is delivered to it. This is fully defined in ECMA-CSTA in "Call Control Services and Events". The request contains the representative value read from the Microsoft registry on the user's computer. The server then sends the request together with the representative value to the host computer 26 in the CTI system. The host computer is able to identify the correct directory number from the representative value, e.g. with reference to a simple look-up table on the host computer cross-referencing the representative value with the DN. The host computer is then able to pass on the request together with the DN to the communications switch (PABX 10).

In an alternative embodiment, the secure cookie can be provided by the registration server direct to the server for storage in the directory. According to this embodiment, when the user wishes to initiate activity in the communications system via the server, it first obtains a copy of the representative value from the active directory. On receipt of the representative value, the user then sends a "monitor start" message to the server as described in the first embodiment, above. The process is then completed as described above for the first embodiment.

Neither the registry on the user's computer terminal nor the server is aware that a representative value is being used in place of the genuine directory number. What is in fact stored in the registry or in the active directory is a value that is indistinguishable to them from a working directory number. The directory therefore operates in a conventional manner, albeit on different data.

Systems such as these also receive telephony events, i.e. the Computer-Supported Telephony Applications (CSTA) delivered event which provides information in a screen pop, e.g. "Incoming Call from Fred Bloggs". It would be possible for such events to be spoofed, e.g. another user with access to the third party system can find a user's DN from the directory and use it to spoof an incoming screen pop. When operating with a system implementing the invention, the directory made available to users of the third party system, e.g. LCS Client, will contain representative values, not true DNs so that they will only be able to set the initial monitor using the representative value, not the true DN. Interpretation of the representative value is only possible in the CTI system, e.g. the host computer will accept the representative value from the third party system and, if valid, replace it with the appropriate DN value in the pop-up message.

We have described the above invention in terms of a conventional PBX. However, the users might be performing telephony via a SIP based soft PBX or in a non-PBX environment on a SIP peer to peer basis. Once again, telephony statistics can still be monitored and can be linked together as the system will comprise SIP URIs. The present invention is applicable to, and not limited by, traditional PBXs, PSTN, Centrex, Hosted, Mobile and Managed switches, either circuit switched, or packet switched, VoIP: in fact any current or future communications environment. We have described the Computer Terminal as a separate device from the Communications Terminal. They could equally well share the same physical device, ie PC, Mobile Handset, PDA etc. Reference in the present description to a "cookie" is indicative that browser based registration is an option but is not limiting in any way as to the form or means of delivery of the abstract representation. The identity of the communications terminal may be in the form of but is not limited to a telephone number or DN. Anything that identifies communication, i.e. a SIP URL could be used.

Association of the communications terminal and computer terminal may be achieved in a number of ways and is not limited to the methods described above. The present invention achieves flexibility in offering CTI capability via third-party systems whilst maintaining security and without the additional complexity of introducing restrictions in the third party system. Security could be provided by the third party server if, for example, the third party administrator configured the DN to prevent unauthorized changes, but this would be expensive and give no flexibility. A system according to the present invention is both secure and flexible (the user can re-register a different DN) with low administration costs.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language) or industry equivalents. As the skilled person will appreciate, the code may be distributed between a plurality of coupled components in communication with one another.

The invention claimed is:

1. A method of securely registering an association between a computer terminal and a selected one of a plurality of communications terminals in a computer telephony system, the method comprising:

establishing an association between the identity of the selected communications terminal and the identity of the computer terminal to allow for control of the communications terminal by a user via the computer terminal;

generating an abstract representation in place of the actual identity of the communications terminal and providing the representation to a third party system accessible by the user; and enabling an action to be initiated in the computer telephony system in response to a request for the representation being sent from the computer terminal to a server outside of the computer telephony system, the representation being received at the computer terminal, and a subsequent request for the action including the received representation being sent from the computer terminal to the server.

2. A method as claimed in claim 1, further comprising storing the representation on the computer terminal.

3. A method as claimed in claim 1, further comprising storing the representation in a registry on the computer terminal.

4. A method as claimed in claim 1, further comprising sending the representation to the server outside of the computer telephony system for storing in a storage area accessible by the server.

5. A method as claimed in claim 1, further comprising receiving at the computer telephony system the representation from the third party system and identifying in the computer telephony system the communications terminal represented.

6. A non-transitory computer readable carrier medium carrying a computer program or set of computer programs configured to carry out, when said program or programs is/are run on a data-processing system, the method of claim 1.

7. A method as claimed in claim 1, wherein the abstract representation is a replacement for a directory number, the abstract representation having no significance outside of the computer telephony system.

8. A method as claimed in claim 1, further comprising storing the representation on the computer terminal.

9. A method of securely registering an association between a computer terminal and a selected one of a plurality of communications terminals in a computer telephony system, the method comprising:
 establishing an association between the identity of the selected communications terminal and the identity of the computer terminal to allow for control of the communications terminal by a user via the computer terminal;
 generating an abstract representation in place of the actual identity of the communications terminal and providing the representation to a third party system accessible by the user; and
 enabling an action to be initiated in the computer telephony system in response to a request being sent from the computer terminal to a server outside of the computer telephony system, wherein the request contains the representation.

10. A non-transitory computer readable carrier medium carrying a computer program or set of computer programs configured to carry out, when said program or programs is/are run on a data-processing system, the method of claim 9.

11. A computer telephony system, comprising:
 a plurality of communications terminals; and
 registration means for establishing an association between the identity of a computer terminal and the identity of one of the communications terminals to allow for control of the communications terminal by a user via the computer terminal;
 wherein the registration means is further configured in use, upon establishing the association, to generate an abstract representation in place of the actual identity of the communications terminal and to provide the representation to a third party system accessible by the user; and
 wherein the computer telephony system is configured to initiate an action in response to a request for the representation being sent from the computer terminal to a server outside of the computer telephony system, the representation being received at the computer terminal, and a subsequent request for the action being sent from the computer terminal to the server.

12. A computer telephony system as claimed in claim 11, further comprising a store for storing the representation on the computer terminal.

13. A computer telephony system as claimed in claim 11, further comprising a registry for storing the representation on the computer terminal.

14. A computer telephony system as claimed in claim 11, further comprising means for sending the representation to the server outside of the computer telephony system for storing in a storage area accessible by the server.

15. A computer telephony system as claimed in claim 11, wherein the representation has a format for allowing the third party system to treat the representation in the same way as it would treat the corresponding identity.

16. A computer telephony system as claimed in claim 11, further comprising means for receiving the representation from the third party system and identifying in the computer telephony system the communications terminal represented.

17. A communications system comprising the computer telephony system of claim 11.

18. A computer telephony system, comprising:
 a plurality of communications terminals; and
 registration means for establishing an association between the identity of a computer terminal and the identity of one of the communications terminals to allow for control of the communications terminal by a user via the computer terminal;
 wherein the registration means is further configured in use, upon establishing the association, to generate an abstract representation in place of the actual identity of the communications terminal and to provide the representation to a third party system accessible by the user; and
 wherein the computer telephony system is configured to initiate an action in response to a request being sent from the computer terminal to a server outside of the computer telephony system, wherein the request comprises the representation.

19. A computer telephony system as claimed in claim 18, further comprising a store for storing the representation on the computer terminal.

* * * * *